Dec. 25, 1951     E. ALLGAIER     2,579,779
COLOR VISION TESTING DEVICE
Filed May 15, 1947
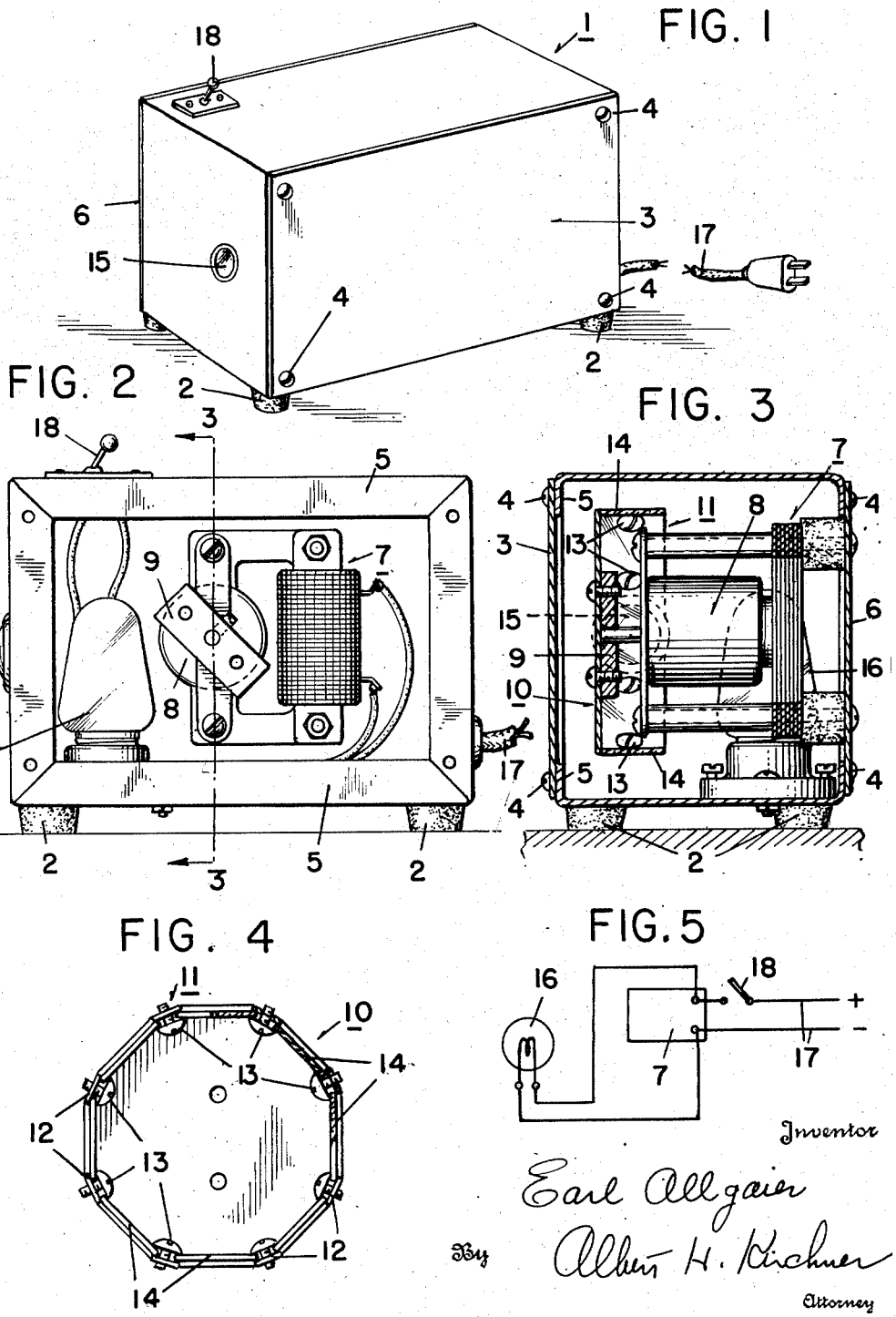
Inventor
Earl Allgaier
Albert H. Kirchner
By
Attorney Patented Dec. 25, 1951

2,579,779

UNITED STATES PATENT OFFICE 2,579,779

COLOR VISION TESTING DEVICE

Earl Allgaier, Arlington County, Va.

Application May 15, 1947, Serial No. 748,264

1 Claim. (Cl. 88—20)

The present invention relates to color vision testing devices and aims particularly to provide a practical instrument for quickly and accurately determining the ability of motor vehicle drivers to distinguish and recognize the standard traffic signal light colors of red, green and yellow or amber sufficiently promptly for such persons to be considered safe drivers.

The prior art provides several kinds of media for general color vision testing, but none of these is particularly adapted to meet the requirements that are filled by the present invention, i. e., to function quickly and unfailingly to indicate whether a person has insufficient color vision acuity to qualify him to operate a motor vehicle whether or not he may be considered technically color-blind by some other and more exacting standards which are not relevant to driving conditions. It is a well recognized fact that many persons are unable to pass one or another of the conventional card or yarn tests and yet have sufficiently good color vision to distinguish quickly between the standard stop, go and caution colors of the traffic light signals that are universally used at street and highway intersections. Such testing means are therefore useless in the examining of motor vehicle drivers or of applicants for motor vehicle driving licenses because they rule out and reject many persons whose color vision is subnormal but nevertheless adequate for traffic signal light perception. So far as I am aware, prior to the present invention no device has been available for the particular limited purpose of determining traffic signal color blindness as such.

With the foregoing principal object in view, incidental objects and purposes of the invention are to provide a device of the general character indicated which will be inexpensive to manufacture, small and compact in size, easily operated by anyone without particular experience or the exercise of special skill, and which can be used within the confines of a comparatively small room, whether illuminated or dark, and will quickly give unfailingly reliable results.

The accompanying drawing illustrates an embodiment of the invention which I have actually made and used with entirely satisfactory results, so that this embodiment is at present preferred by me although I recognize that the principles of the invention may be incorporated in other and differently modified forms, all within the scope of the inventive principles as defined by the appended claim.

In the drawing:

Figure 1 is a perspective view of the device;

Fig. 2 is a side elevational view of the casing, with its closure plate and color-bearing wheel removed, showing the principal internal mechanism;

Fig. 3 is a cross section on the line 3—3 of Fig. 2 with, however, the closure plate and color-bearing wheel in place;

Fig. 4 is a view of the color-bearing wheel, taken partly in side elevation and partly in section; and Fig. 5 is a diagrammatic view showing the electrical circuit.

Generally speaking, the invention comprises a device for realistically simulating the appearance of actual traffic signal lights. The subject taking the test observes the simulated appearance and is required to name the colors as they flash on and off in the same manner as the lights which they imitate. The subject's responses are observed by the person conducting the test, who is thus able, after a few flashes made in a matter of a minute or less, to determine whether the subject is capable of distinguishing and recognizing the standard signal light colors as they are seen by a motorist under actual driving conditions.

The device comprises generally an outer casing 1 of rectangular box-like shape, which may be quite small, for example, 5 x 3 x 4 inches and may be provided with small rubber cushion feet 2 for for mounting on a table or shelf. The casing may be made of any convenient material, such as sheet metal, and its interior is best made accessible by a removable closure plate 3 which forms one side and is screwed at 4 to mitered flanges 5 which are inturned from the top, bottom and end walls.

Opposite this removable closure plate is a similar back plate 6 which can be removably or permanently mounted on corresponding flanges at the rear of the box and which permanently supports a motor generally designated 7.

Mounted directly on the armature shaft of this motor is a reduction gearing device 8, the shaft of which carries fixed at its outer end a radiating bracket 9 apertured for mounting a color-bearing wheel 10.

This wheel, in a device of the suggested size and proportions, may have a diameter of about 3½ inches and is provided at its periphery with an axially directed flange 11 in the form of a plurality of circumferentially spaced right angularly turned ears 12 in the number of approximately eight, more or less. Each of these ears is perforated to receive the shank of a small bolt 13. Clamped between the head and nut of each adjacent pair of bolts, or between washers mounted on them, are the opposite margins of small panes or plates 14 of colored glass which may be and preferably are pieces of actual traffic light lens glass colored in the standard red, green, and yellow or amber, and having the full original thickness of such lenses.

The wheel 10 is mounted on the bracket 9 with the flange 11 instanding, so that the panes 14 will be interposed between an opening 15 in the panel forming the front wall of the casing and an electric light bulb 16 mounted in the casing, in front of the motor 7. Thus, when the wheel is rotated by the motor and the light bulb is energized, light from the bulb is transmitted through the opening 15 in flashes of different colors, determined by the coloring of the panes 14, separated at intervals by the opaque metal of the bolts 11 and/or by the nuts and washers mounted thereon.

I have found it convenient to use as the motor 7 a conventional synchronous A. C. motor like those commonly used in electric clocks, and to employ reducing gear 8 which will give a speed of three or four R. P. M. to the wheel 10. With such values as these, when approximately eight panes are mounted on the wheel as shown in the illustrated embodiment, the flashing of the differently colored rays through the opening 15 can be made to occur at intervals of from one to two seconds, more or less, depending on the speed of rotation, the number and size of the panes, and the peripheral length of the opaque nut and bolt or washer metal between the panes. Flash durations of this order have been found in practice appropriate for determining whether a motor vehicle driver's response is quick enough, but of course these durations are merely suggested and exemplary and form no part of the inventive principles of the instrument, and can be varied and selected at will to suit more exacting or more liberal standards.

The motor and light bulb may be connected in parallel, as shown by the circuit diagram in Fig. 5 and may be supplied by a flexible lamp cord 17 with a switch 18 interposed in the circuit and mounted conveniently on the box 1, as at the top thereof. The opening 15 may be closed by a window or crystal of clear glass or other transparent material to keep out dust and other foreign matter out of the box.

The panes 14 are best mounted in a random color arrangement around the wheel 10 so that the color flashes do not necessarily follow each other in the regular traffic signal sequence of red, yellow, green, yellow, etc. Hence a subject viewing the flashes will not be able to guess the color of any flash from the color of the preceding flash.

In use, the device is mounted on a table, shelf or other surface and the subject to be tested observes the opening 15 from some predetermined relatively short distance. If this distance be fifteen feet, and the diameter of the opening 15 be three-eighths inch, the appearance to the observer will be the same as that presented by a traffic light lens of the standard eight inch diameter seen from a distance of 320 feet. The switch 18 is closed and the subject is required to name the colors that are flashed through the opening 15. The effect is entirely realistic since it simulates perfectly the appearance of a traffic signal light, both as to size and exact color shading. A person successfully recognizing the color flashes from this instrument can be regarded as necessarily capable of making similar recognition of the color flashes of actual traffic signal lights, and this is true whether or not the person may have subnormal color vision by some more exacting or sensitive standards.

While of course the intensity of the light produced by the bulb 16 is not critical, I have found that a seven watt 110 volt candelabra base bulb gives excellent results when used with a device having the dimensions and proportions hereinabove suggested.

The device can be used in a lighted room to simulate daytime driving conditions, or in a dark room to reproduce the conditions of night driving. It can be altered in detail, as has hereinabove been suggested. In all cases the net result is an accurate determination of the qualification of a tested subject to respond properly to actual traffic signal lights under actual roadway conditions without involving the trouble, time, expense and danger of requiring the subject to undergo a roadway test.

I claim:

A device for testing color vision acuity in relation to standard vehicular traffic signal lights comprising a housing having a vertical wall provided with a circular opening, an electric lamp in the housing arranged to transmit a light beam to the opening, an electric motor in the housing, a wheel mounted in the housing for rotation at constant speed by the motor and having right-angularly turned from its periphery a series of angularly shaped ears, a plurality of differently colored translucent panes each carried between adjacent ears and adapted with said ears to be successively interposed in the light beam for causing differently colored light rays to be flashed successively at regular intervals through the opening with regularly occurring interruptions to the beam caused by said ears, said panes being colored like the lenses of standard vehicular traffic signal lights and being arranged in random color order and in sufficient number to make it impossible for a subject being tested to anticipate the color of any of the panes.

EARL ALLGAIER.

REFERENCES CITED

The following references are of record in the file of this patent:

UNITED STATES PATENTS

| Number | Name | Date |
|---|---|---|
| 1,683,117 | Yoas | Sept. 4, 1928 |
| 1,964,591 | Nanfeldt | June 26, 1934 |
| 2,293,106 | Bourdakoff | Aug. 18, 1942 |

FOREIGN PATENTS

| Number | Country | Date |
|---|---|---|
| 5,919 | England | of 1909 |
| 437,970 | England | Nov. 8, 1935 |